UNITED STATES PATENT OFFICE.

LOUIS KRIEGER, OF PARIS, FRANCE.

MOTOR DRIVEN AND STEERED FORE CARRIAGE FOR AUTOMOBILES.

No. 886,990.  Specification of Letters Patent.  Patented May 5, 1908.

Application filed January 10, 1906. Serial No. 295,502.

*To all whom it may concern:*

Be it known that I, LOUIS KRIEGER, of 45 Boulevard Haussmann, Paris, France, engineer, have invented a new and useful Improvement in Motor Driven and Steered Fore Carriages for Automobiles, which improvement is fully set forth in the following specification.

This invention relates generally to automobiles, and particularly to a novel form of axle sleeve movable about a pivot placed in a vertical line drawn through the point of contact of the wheel with the ground in order absolutely to avoid any effect whatever upon the steering without the intermediary of any disconnecting or other switch in the electric circuits, should there be an inequality in the power of the driving motors, or should damage be done to one or both of them.

In opposition to known arrangements of the same kind, this invention consists in obtaining the above results by the combination of a pivot placed in the axle sleeve, which for this purpose is made hollow and is only capable of an angular movement about the pivot, with a motor affixed upon the axle sleeve and driving, through a single train of gearing, the hub of the wheel which is formed as an axle box and rotates on the non-rotatable axle sleeve. This arrangement is particularly simple and light, and permits of easy and thorough lubrication, and also allows any suitable amount of dishing to be given to the wheels.

The annexed drawing illustrates one method of carrying out this invention.

Figure 1:
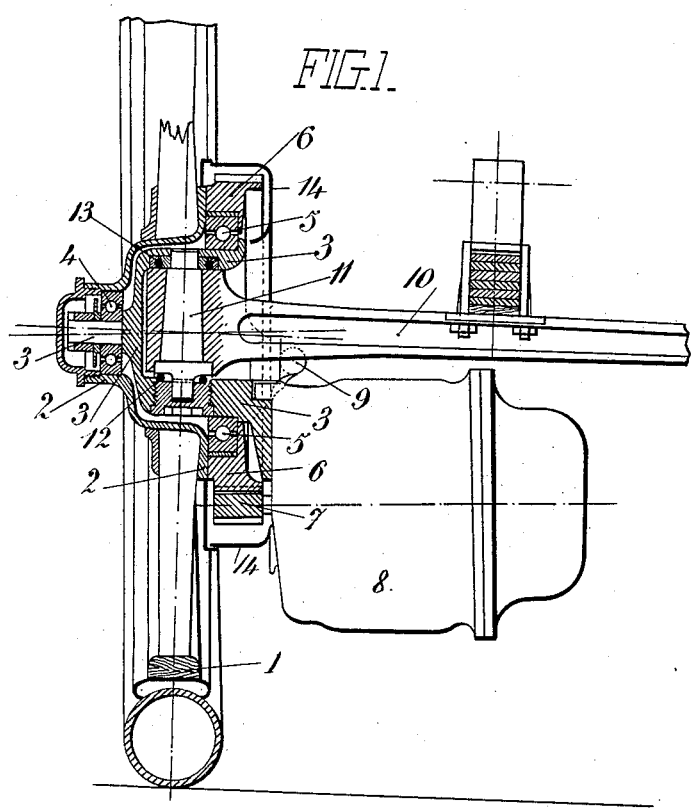
Figure 2:
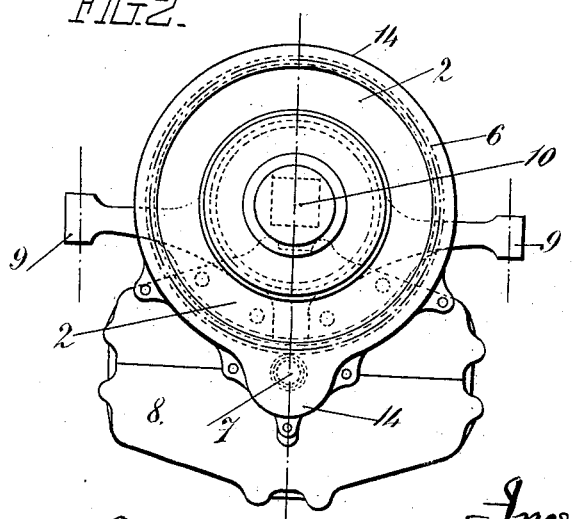

Figure 1 is a vertical section taken through the axis of the wheel. Fig. 2 is an outside front elevation of the same.

The wheel 1 is mounted upon a hub 2 which turns upon the axle sleeve 3 with two rings of balls 4 and 5. This hub carries a gear wheel 6 which receives movement from the pinion 7 of the motor 8. The motor is fixed by a lug and bolts to the axle sleeve 3 and takes part together with the said sleeve in all the angular steering movements. This axle sleeve also carries the coupling arms 9 of the steering arrangement and is connected to the axle 10 by a pivot 11 provided with two rings of balls 12 and 13; the axis of the pivot is vertical and passes through the theoretical point of contact of the wheel with the ground. A casing 14 incloses the train of gearing. By this arrangement there is no movement in a horizontal plane of the lever arm with respect to the pivot due to the reactions caused by the variations in the strain upon the pinion of the motor, these reactions cannot therefore influence the steering.

Claim—

1. In a vehicle, the combination, with an axle, and an axle sleeve pivoted to the axle and provided with hub-bearings at each side of the pivotal point, of a wheel having a hub journaled upon the said hub-bearings, a motor carried by the axle sleeve, and gearing intermediate the wheel and motor whereby the wheel is driven.

2. In a vehicle, the combination, with an axle, and an axle sleeve arranged to inclose the end of the said axle, of a wheel mounted upon the axle sleeve, bearings intermediate the wheel hub and axle sleeve at each side of the wheel, a pivot pin connecting the axle and axle sleeve and having its axis in a vertical line through the theoretical point of contact of the wheel with the ground, a motor supported by the axle sleeve, and gearing between the motor and wheel whereby the wheel is driven.

3. In a vehicle, the combination, with an axle having a vertical pivot socket in its end, of an axle-sleeve inclosing the end of the axle and provided with hub-bearings at each side of said pivot-socket, a hub attached to the wheel and mounted on said hub-bearings, a wheel connected to the hub intermediate the hub-bearings, a pivot pin in the pivot-socket and engaging the axle sleeve, the axis of said pivot pin being in a vertical line through the theoretical point of contact of the wheel with the ground, a motor carried by the wheel socket and gearing intermediate the wheel and motor whereby the wheel is driven.

In testimony whereof I have signed this specification in the presence of two subscribing witnesses.

LOUIS KRIEGER.

Witnesses:
 HANSON C. COXE,
 GASTON DE MESTRAL.

No. 886,990. PATENTED MAY 5, 1908.
L. KRIEGER.
MOTOR DRIVEN AND STEERED FORE CARRIAGE FOR AUTOMOBILES.
APPLICATION FILED JAN. 10, 1906.

Witnesses:
E. O. Hildebrand
J. W. Sterner

Inventor
Louis Krieger
by George Macsid
Attorney